(12) United States Patent
Kotzin et al.

(10) Patent No.: US 6,917,641 B2
(45) Date of Patent: Jul. 12, 2005

(54) METHOD AND APPARATUS FOR DETECTING SOFTWARE TAMPERING IN A SUBSCRIBER DEVICE

(75) Inventors: Michael D. Kotzin, Buffalfo Grove, IL (US); Duane Rabe, Hawthorn Woods, IL (US)

(73) Assignee: Motorola, Inc., Schaumburg, IL (US)

( * ) Notice: Subject to any disclaimer, the term of this patent is extended or adjusted under 35 U.S.C. 154(b) by 10 days.

(21) Appl. No.: 10/201,708

(22) Filed: Jul. 23, 2002

(65) Prior Publication Data

US 2004/0017839 A1 Jan. 29, 2004

(51) Int. Cl.$^7$ ................................................. H04B 1/69
(52) U.S. Cl. ........................ 375/130; 375/141; 375/146; 714/774; 455/410; 455/411; 455/415
(58) Field of Search ................................ 455/410, 411, 455/415; 375/141, 146, 130, 140, 142, 147, 150; 714/774; 370/209

(56) References Cited

U.S. PATENT DOCUMENTS

| | | | | |
|---|---|---|---|---|
| 5,103,459 A | * | 4/1992 | Gilhousen et al. | 370/206 |
| 5,862,160 A | * | 1/1999 | Irvin et al. | 714/807 |
| 5,999,561 A | * | 12/1999 | Naden et al. | 375/142 |
| 6,246,675 B1 | * | 6/2001 | Beasley et al. | 370/342 |
| 6,389,138 B1 | * | 5/2002 | Li et al. | 380/35 |

* cited by examiner

*Primary Examiner*—Jean B Corrielus
*Assistant Examiner*—Guillermo Munoz
(74) *Attorney, Agent, or Firm*—Charles W. Bethards

(57) ABSTRACT

A subscriber device (2) includes a long code generator (12) and a modifier (30) for generating a spread bit stream with a predetermined error pattern that is transmitted by a transmitter (16) at the subscriber device (2) to a base station (3). The base station (3) identifies the current subscriber device properties by identifying the error pattern and subsequently compares the current subscriber device properties with a knowledge base of subscriber device software properties associated with the error pattern in the spread bit stream. The knowledge base is stored in a memory source (4).

23 Claims, 5 Drawing Sheets

*1*

US 6,917,641 B2

METHOD AND APPARATUS FOR DETECTING SOFTWARE TAMPERING IN A SUBSCRIBER DEVICE

FIELD OF THE INVENTION

The present invention relates generally to communication systems and, more specifically, to methods and apparatus used in such systems to detect the use of unauthorized software within such systems.

BACKGROUND OF THE INVENTION

Conventional communication systems, such as cellular handsets and other subscriber devices are growing in flexibility and capability. In the near future, such subscriber devices and the capabilities of these devices will be largely software controlled and defined. Unscrupulous individuals may take advantage of these devices and their flexibility by loading unauthorized software thereon or altering the software program included in the device by the manufacturer. Such loading of unauthorized software or altering of the software program could permit an individual to obtain more advanced device features for little or no cost. This is detrimental to the service provider and/or the subscriber device manufacturer due to the loss of due revenue for this misappropriated feature and/or software.

In yet another example, an individual with a stolen subscriber device could alter the identity of the stolen subscriber device by modifying the software thereon. After altering the identity of the stolen subscriber device, this individual would be able to use the stolen subscriber device at the expense of another user. Such actions by unscrupulous individuals may significantly increase the costs of services for other users. Clearly a need exists for methods and apparatus that inexpensively and transparently identify the use of unauthorized software in communication systems.

BRIEF DESCRIPTION OF THE DRAWINGS

Objects and advantages of the present invention will be more readily apparent from the following detailed description of the preferred embodiments thereof when taken together with the accompanying drawings in which.

DETAILED DESCRIPTION OF THE PREFERRED EMBODIMENTS

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions.

Figure 1:
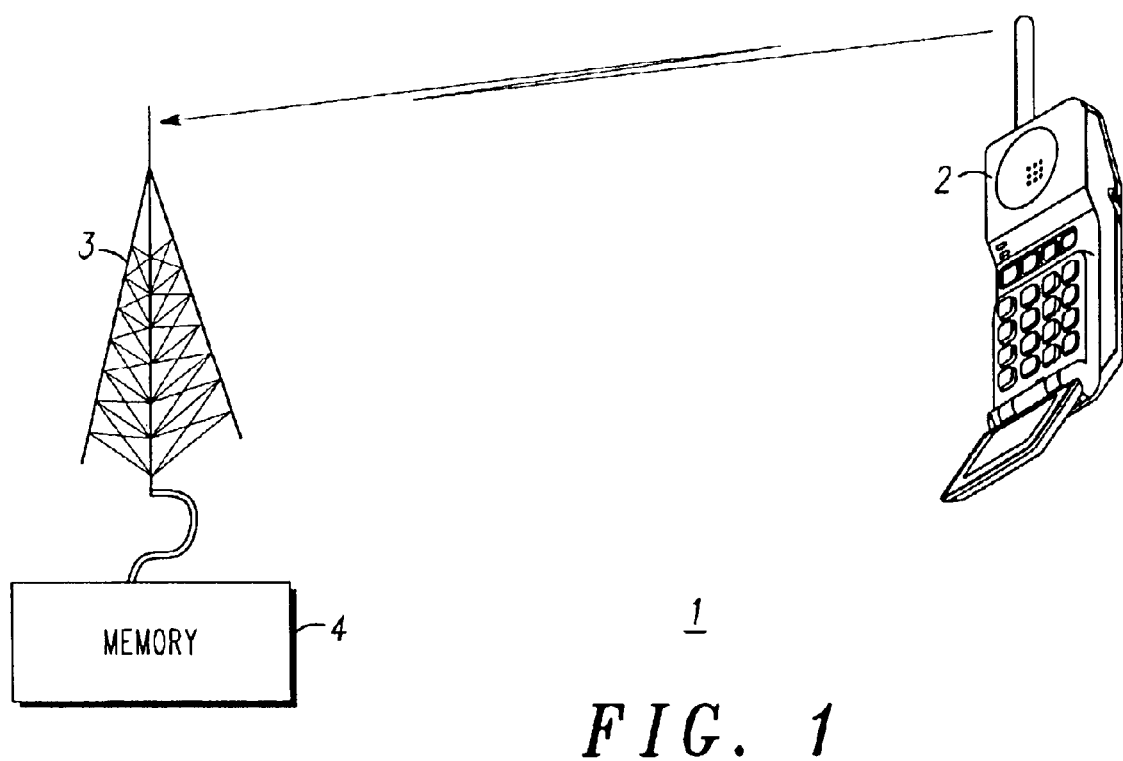
FIG. 1 is an exemplary view of a system architecture in which the present invention is implemented.

Referring now to the drawings in which like numerals reference like parts, FIG. 1 shows an exemplary system (system) 1 in which the present invention is implemented. The system 1 includes a subscriber device 2 such as, for example, a code-division multiple access (CDMA) cellular handset and a base transceiver station (BTS) 3. The BTS 3 has access to a memory source 4 that stores a knowledge base of error chip identifiers. The system 1 will be described in more detail below.

Figure 2:
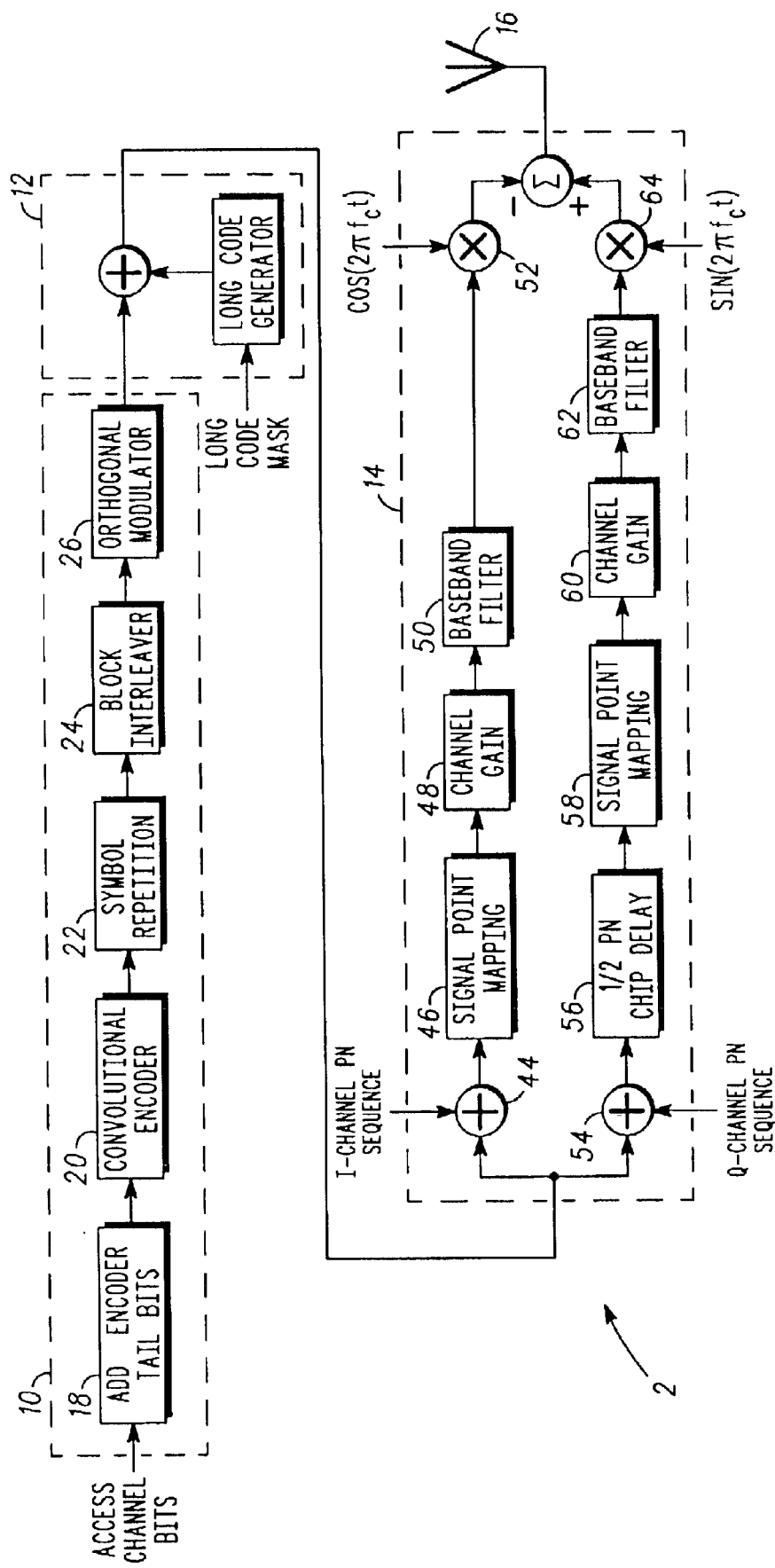
FIG. 2 is a block diagram of the subscriber device transmission processing according to the present invention.

Referring now to FIG. 2, as those of ordinary skill in the art will appreciate, the subscriber device 2 includes a CDMA modem that has a plurality of signal processing means for generating a signal that is sent to the BTS 3. The signal processing means includes an information generator (not shown), an encoding block 10, a long code generator 12 and a quadrature processing block 14. The subscriber device 2 also includes an amplifier (not specifically shown) that amplifies the signal from processing block 14 and couples the amplified signal to an antenna 16. The information generator is for generating a stream of channel bits, representing the information, control and payload, for the reverse (mobile to base) radio channel. The encoding block 10 is for performing encoding operations on the bit stream as is known. The encoding block 10 includes an add encoder tail bits function 18 that adds 8 tail bits to the channel bit stream for flushing the convolutional encoder 20. The convolutional encoder 20 is for convolutionally encoding the channel bit stream according to the known convolutional codes used in CDMA systems, such as IS-95. The encoding block 10 also includes a symbol repeater 22, block interleaver 24 and a modulator 26 all as known. The modulator 26 is preferably a 64-ary orthogonal modulator and is for grouping sets of 6 consecutive bits output from the interleaver 24 into a row address for a memory that contains a 64 by 64 Walsh matrix. Once a row is selected, all 64 bits that make up a row are output at a rate of approximately 307.2 kHz to provide a bit stream that corresponds to the previously modified information channel bits. The long code generator 12 is for generating a long code comprised of a plurality of bits, preferably at a 1.2288 MHz bit or chip rate, for introducing an error pattern in the long code that corresponds to a subscriber device type to provide an error long code or long code with an error pattern and for spreading the bit stream by the error long code to provide an error spread bit stream at a 1.2288 MHz chip rate.

The quadrature processing block 14 initially splits the error spread bit stream into an I branch or channel and a Q branch or channel. With respect to the I branch, there is provided an I-Channel PN Sequence spreader 44, a first signal point mapping block 46, a first channel gain block 48, a first base band filter 50 and a first mixer, or upconverter 52. With respect to the Q branch, there is provided a Q-Channel PN sequence spreader 54, a half chip delay device 56, a second signal point mapping block 58, a second channel gain block 60, a second base band filter 62, and a second mixer, upconverter 64. The outputs of the first and second mixers 52, 64 are summed and sent to the amplifier and thus antenna 16, where it is transmitted to the BTS 2. Those skilled in the art should understand the function and nature of the information generator, encoding block 10, the quadrature processing block 14 and the amplifier.

Figure 3:
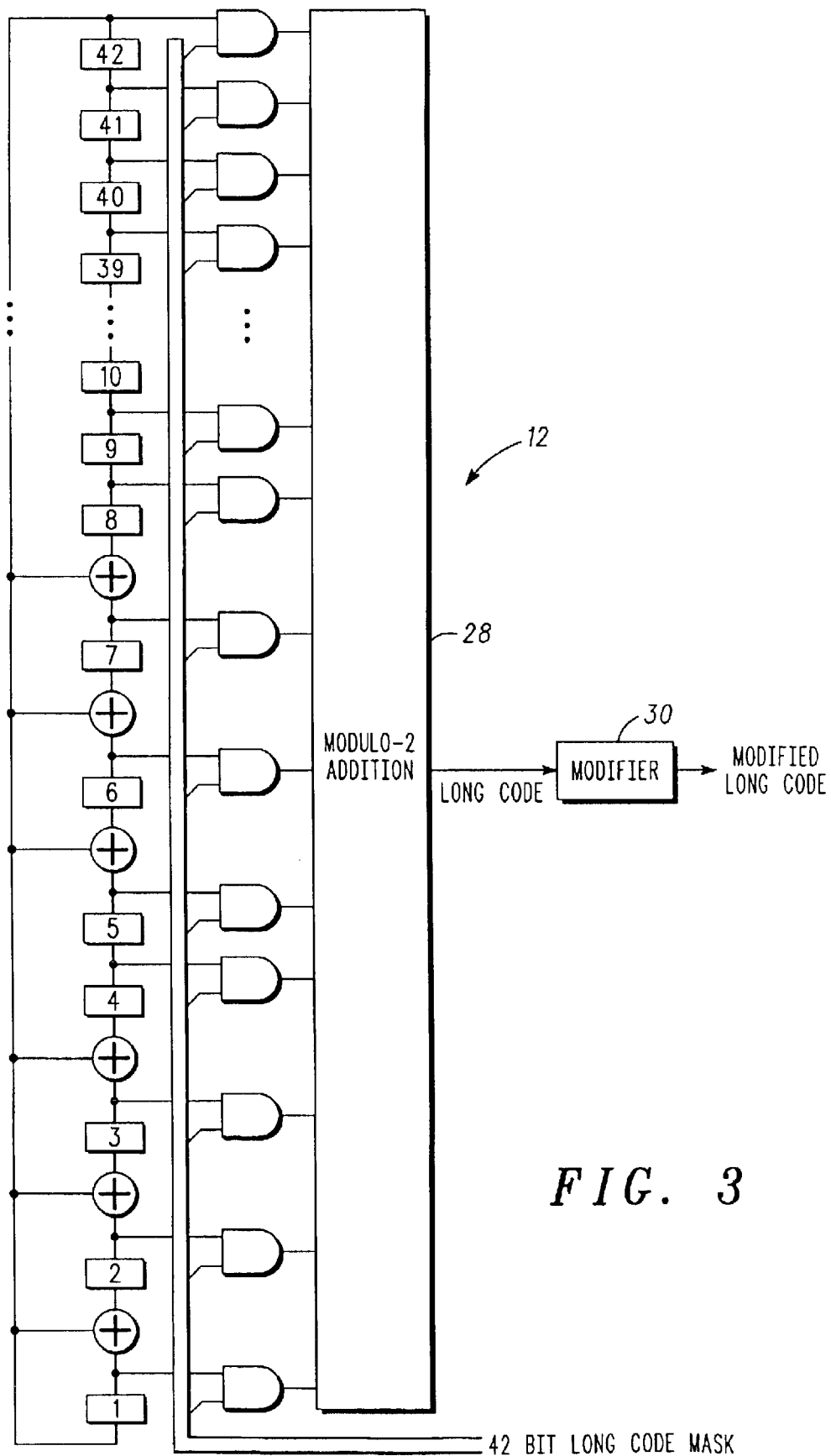
FIG. 3 is a circuit diagram of a preferred embodiment of a long code generator according to the present invention.
Figure 5:
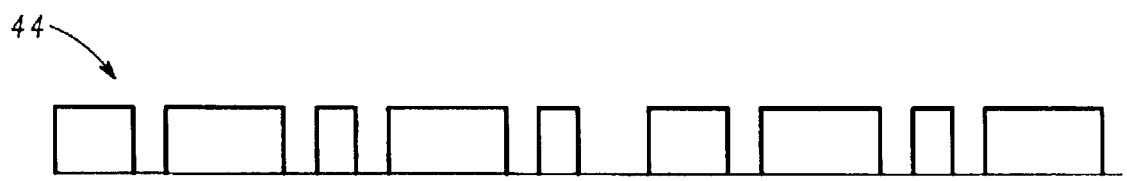
FIG. 5 is a view of an exemplary long code.

Referring to FIG. 3, the long code generator 12 will be described and discussed in more detail. The long code generator 12 includes a known modulo-2 shift register 28 and a modifier 30. The modulo-2 shift register 28 is for continuously shifting at a 1.2288 MHz rate the contents of a 42 bit long clocked register with feedback, as depicted, and for performing modulo-2 addition of the resultant 42 bit shift register state ANDed bit by bit with a 42 bit long code mask. This long code mask is based on a subscriber device user's identification and is therefore unique for each user. The modulo-2 sum of the 42 bits that results from this operation provides a time-sequenced output, which is the long code and this is applied to the modifier 30. An exemplary long code 44 is shown in FIG. 5.

Figure 4:
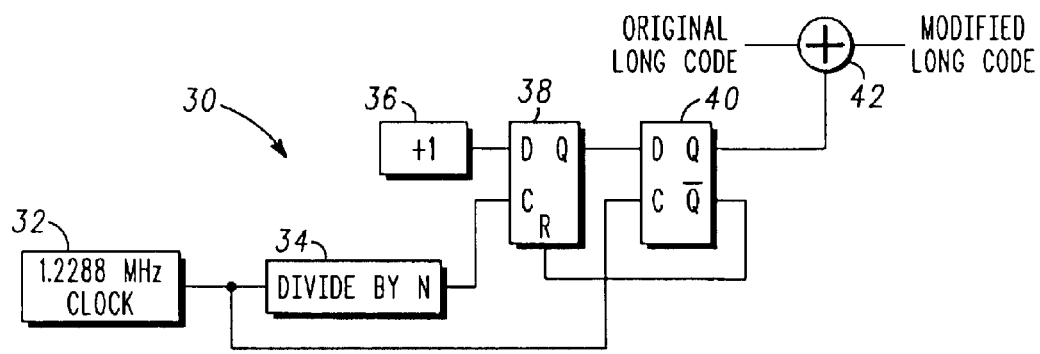
FIG. 4 is a circuit diagram of a preferred embodiment of a modifier according to the present invention.
Figure 6:
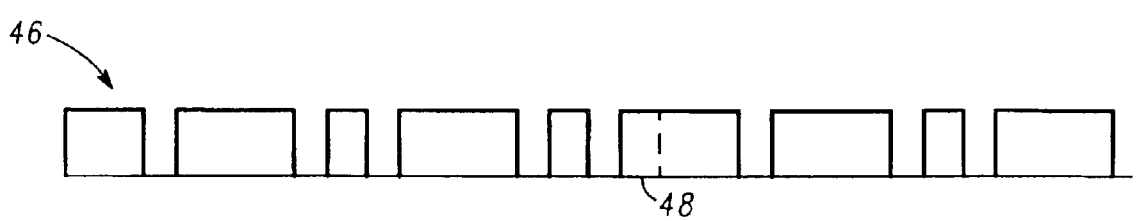
FIG. 6 is a view of an exemplary error long code embodiment according to the present invention.

Referring to FIG. 4, the modifier 30 of the long code generator 12 will be discussed in more detail. The modifier 30 is in electronic communication with the modulo-2 shift register 28 via a signal path and in a preferred embodiment suitable for introducing an error pattern in the spread bit stream or specifically the long code and thus the spread bit stream. The modifier 30 includes a clock signal 32 that is the same as the clock signal used for the long code generator shown in FIG. 3, a divisor device 34, a constant signal generator 36, a sequential circuit composed of a first and second D flip flop 38, 40 and a gated output 42 intercoupled as shown. The clock signal directly drives the second flip-flop 40 and is an input into the divider or divisor device 34. The divisor device 34 is for dividing the clock signal by a predetermined number N and for driving the first flip flop 38. The constant signal generator 36 generates a constant signal such as, for example, high, and also drives the first flip flop 38. The gated output 42 is, for example, an exclusive or gate, and is for summing (exclusive or) the output of the second flip-flop 40 with a bit of the long code. As those skilled in the art will understand, depending on the output of the divisor device 34, the first flip flop 38 will either be reset or set, which will drive the second flip flop 40. The second flip flop 40 will either generate a high or low output depending on the output from the first flip flop 38 and the clock device 32. If the second flip flop 38 generates a high output, a bit (or chip) in the long code will be inverted by the gate 42 and provided at its output. Thus, the output of the second flip flop 40, or the error bit, is introduced into the long code. The divisor device 34 can be selected and synchronized with the system frame timing so that the second flip flop 40 introduces the error bit in synchronization with a framed and deterministic location within the transmitted signal. More specifically, the high output (or error bit) will be generated at predetermined locations in the long code that may be known to a BTS receiver for each subscriber device type. The predetermined locations selected correspond to the subscriber device type. FIG. 6 shows a long code with an error pattern 46 comprised of one inverted and this instance high bit introduced therein. It is appreciated that the introduction of an error bit will be repeated every N long code bits or chips.

Referring back to FIG. 1, the BTS 3 has access to a memory source 4 that stores a knowledge base, such as a database of error pattern identifiers, each of which corresponding to a subset of particular subscribers. The memory source 4 may be, for example, known RAM, PROM, EEPROM, magnetic memory, etc. As those skilled in the art should understand, the BTS 3 receives the spread bit stream from the subscriber device 2 and authenticates the subscriber device 2 via normal subscriber device authentication techniques. The long code generator (not shown) of the BTS 3 is initially synchronized with the long code generator 12 of the subscriber device 2. Therefore, as will be more fully described below, the BTS 3 is able to identify the long code generated by the long code generator 12 of the subscriber device 2.

In the preferred embodiment, the number of error chips generated in the long code is small enough so that a conventional receiver may be used for signal acquisition and signal ray tracking by ignoring the error chips. The BTS 3 is subsequently able to identify any one of potentially numerous possible error patterns introduced by the modifier 30 by utilizing conventional detection techniques. For example, use of a longer averaging time allows for the receiver at the BTS 3 to increase the signal to noise ratio for detection of the error pattern. The BTS 3 can subsequently determine whether the proper subscriber device is being used by a particular subscriber based upon a comparison with the database of error pattern identifiers stored in the memory source 4. The error pattern identifiers in the database correspond to, for example, a subset of particular users. The BTS 3 can also identify the subscriber device type (model, software load, subscriber group) based upon this comparison.

The process by which the BTS 3 determines the particular error pattern will be more fully discussed. The BTS 3 includes a conventional receiver that receives the error spread bit stream in a manner that is, in summary, the reverse of the operations performed by the subscriber unit 2 shown in FIG. 2. The BTS receiver includes an RF-to-quadrature baseband downconvertor. This downconvertor is coupled to appropriate I-channel or Q-channel PN sequence despreaders (which are the same for all users). These despreaders follow offset delay compensation that is provided to compensate for the Q-channel PN chip delay that was performed in the subscriber transmitter. The output of the PN sequence despreaders is coupled to two possible long code despreaders, one of which represents the particular user's long code with errors while the other represents the particular user's log code without errors. These outputs are passed to separate 64-ary Fast Hadamard Transformers. Each Transformer effectively performs a decorrelation for each possible 6 to 64-bit mapping that was performed in the subscriber device. The decorrelation output with the highest energy corresponds to the input 6 bits. If the highest energy outputs for the non-error and the error long code paths are integrated over an appropriate time window, the differential magnitude between these growing higher than an appropriately set threshold is indicative of whether the subscriber transmission used or did not use the expected error long code.

It should be noted that only 64-bit blocks where a possible long code error might have occurred need to be multiply decoded and that only those maximum outputs from the Hadamard Transformer need to be long term averaged. If a significant threshold difference for the test with the error long code is identified as compared to the non-error long code, it can be presumed that the subscriber device belongs to the type for the tested error long code. It should also be noted that by testing for all possible error patterns and comparing the averaged outputs for the maximum, it is possible to determine which device type was used to make the transmission.

Because the long code error pattern for each device may be hard coded into the device or otherwise made resistant to modification by software changes, it can be advantageously used to identify whether the software has been modified. The subscriber device type, for example, would allow the BTS 3 to identify that a subscriber is using stolen or a particular model of a subscriber device 2 that has been reprogrammed. For example, if there are M different device types, each will be coded with one of M possible error long codes. When a subscriber initially buys his equipment, the operator knows or may be informed by the user of the subscriber device type that he or she plans to use. This identification might be marked on each subscriber device 2. The service provider stores this information in the aforementioned database. An unscrupulous individual might try to steal that user's identity by modifying the software in another subscriber device. However, if the hard coded error pattern in the other subscriber device, which dictates the subscriber type, does not match that identified in the database for that particular user, the service provider may immediately discontinue service and inform the user that his identity has been compromised. Alternatively, a user may try to illegally reprogram a subscriber device with features that a particular subscriber device was not charged for nor intended to have. The present invention provides a framework for detecting such actions. The chance that a device has been modified to have the correct error pattern would occur only with probability 1/M.

Figure 7:
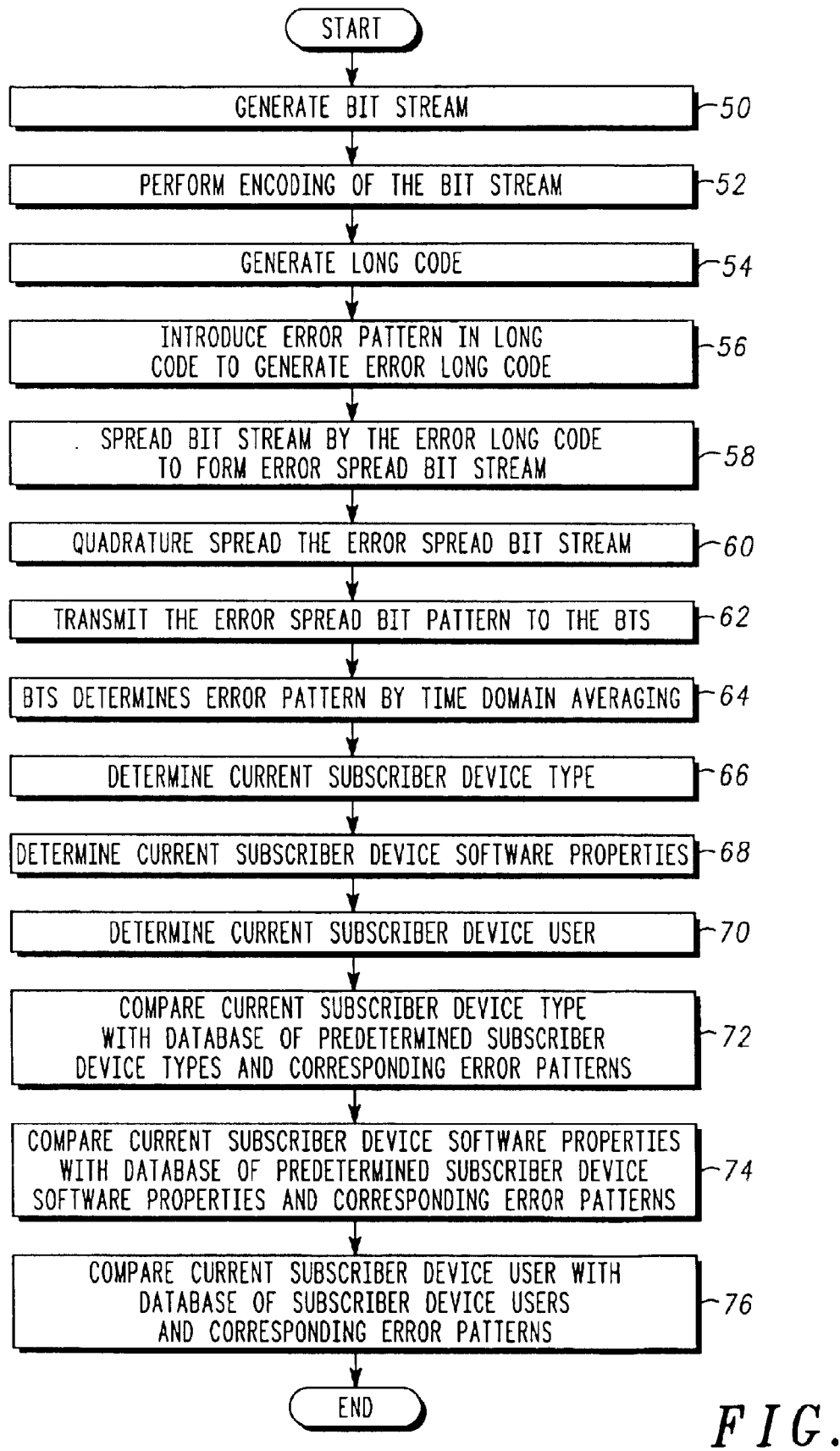
FIG. 7 is a flow diagram of various method embodiments according to the present invention.

Referring now to the flow diagram of FIG. 7, methodology of operation of the system according to the present invention will now be discussed. At 50, the information generator of the subscriber device 2 generates an information bit stream. At 52, the encoding block 10 performs the above-described encoding operations on the information bit stream to provide a bit stream corresponding thereto (see FIG. 2). At 54, the long code generator 12 generates the long code after previously having been synchronized with a long code generator of the BTS 3 and system frame timing. At 56, the modifier 30 introduces the error pattern in the long code to generate the error long code. At 58 the bit stream is spread by the error long code to generate the error spread bit stream. At 60, the error spread bit stream is further processed by the quadrature processing block 14. At 62, the transmitter 16 subsequently transmits the error spread bit stream to the BTS 3.

At 64, the BTS 3 determines the error pattern by, for example, time domain averaging, over each of the possible deterministic error patterns. More specifically, the BTS 3 determines which bits in the bit stream have been inverted by the long code pattern by comparing the spread bit stream with the long code generated by the BTS 3. At 66–70, the BTS 3 determines, respectively, the current type, current software properties and current user of the subscriber device 2 by general BTS—subscriber device authentication techniques known and appreciated by those skilled in the art. One, two or all of the above properties maybe determined.

At 72–76 the BTS 3 compares, respectively, the current device type, software properties and user of the subscriber device 2 determined by the authentication techniques with a predetermined subscriber device software type, a predetermined subscriber device software property, and a predetermined subscriber device stored in the knowledge base that corresponds to the determined error patterns. One, two or all of the above properties may be compared.

The BTS 3 can then determine if a the subscriber device 2 is using software capabilities that are not intended for that subscriber device, if the user of the subscriber device 2 is not the intended user or if the subscriber device type is not the intended subscriber device type based upon the comparison. Therefore, because the BTS 3 can determine the expected or intended properties of the subscriber device 2 based upon the above-mentioned comparisons, the BTS 3 can determine if a subscriber device has unintended properties thus presumptively whether a user has modified the subscriber device software to communicate with the BTS 3. More specifically, if a user modifies the software of a subscriber device 2 to obtain certain or additional cellular services, the BTS 3 will be able to determine that the subscriber device 2 has been modified at the software level because the long code generator 12 is hard coded and will continue to generate the original long code error pattern. The long code error pattern will correspond to the true or intended subscriber device properties indicated in the database because it is a hardware component of the subscriber device modem (not shown).

The structure and the methodology of the present invention provide numerous advantages.

In particular, a system designed in accordance with the present invention will subsequently lower costs due to reduced cellular service and software feature piracy.

While the above description is of the preferred embodiment of the present invention, it should be appreciated that the invention may be modified, altered, or varied without deviating from the scope and fair meaning of the following claims.

For example, the error pattern could be introduced in different points in the subscriber device 2, such as after the bit stream has been spread by the long code but before the bit stream was spread by the quadrature spreading block 14. Alternatively, the error pattern could be introduced during the quadrature processing block 14.

Also, the error pattern could be comprised of any of the chips, each potentially individually modulated in value (i.e. not a simple inversion) or in time (i.e. not fixed in location relative to frame timing). The BTS 3 could determine the set properties of such an error pattern by initially synchronizing with the simple unmodified long code generator 12 of the subscriber device 2 (which is the same for all devices) and then testing for the possible deterministic error sequences.

What is claimed is:

1. A modem for a subscriber device comprising:
    a long code generator for generating a long code comprised of a plurality of bits, for spreading a bit stream by the long code to provide a spread bit stream and for introducing an error pattern in the long code to provide an error spread bit stream, the error pattern corresponding to subscriber device software properties; and
    means for transmitting the error spread bit stream.

2. The modem of claim 1, wherein the long code generator comprises:
    a shift register; and
    a long code modifier in electronic communication with the shift register for introducing the error pattern in the long code.

3. The modem of claim 2, wherein the long code modifier comprises:
    a clock means for generating a clock signal at a predetermined frequency;
    a divisor means in electronic communication with the clock means for dividing the clock signal by a predetermined number;
    a constant signal generator for generating a constant signal; and
    a sequential circuit in electronic communication with the divisor means, the clock means and the constant signal generator for outputting the error pattern.

4. The modem of claim 3, wherein:
    the sequential circuit further comprises two D flip-flops; and
    the shift register further comprises a mod-2 shift register.

5. The modem of claim 1, wherein the error pattern comprises a plurality of error bits introduced at predetermined locations in the error spread bit stream.

6. The modem of claim 5, wherein the predetermined locations in the error spread bit stream correspond to the subscriber device software properties.

7. A method of identifying a subscriber device comprising
    generating a long code comprised of a plurality of chips for spreading a bit stream;
    modifying the long code by introducing an error chip pattern in the long code to provide an error long code that corresponds to a subscriber device model;

spreading the bit stream by the error long code to provide an error spread bit stream; and transmitting the error spread bit stream.

8. The method of claim 7, wherein the modifying the long code by introducing an error chip pattern in the long code to provide an error long code that corresponds to the subscriber device model further comprises introducing a plurality of error chips in the long code at predetermined locations in the error spread bit stream corresponding to a subscriber device property.

9. The method of claim 7, wherein the transmitting the error spread bit stream further comprises transmitting the error spread bit stream over a reverse link channel to a base station.

10. A base station for identifying a subscriber device comprising:

means for receiving a spread bit stream comprised of a plurality of chips from a subscriber device;

means for identifying an error chip pattern introduced by the subscriber device in a long code corresponding to the spread bit stream; and means for identifying subscriber device properties by comparing the error chip pattern with a knowledge base of error chip pattern identifiers.

11. The base station of claim 10, wherein the means for identifying an error chip pattern introduced by the subscriber device in the spread bit stream is further for identifying the error chip pattern over a predetermined time period.

12. A method of detecting software tampering in a subscriber device comprising:

receiving a spread bit stream comprised of a plurality of chips from a subscriber device at a base station;

identifying an error chip pattern introduced by the subscriber device in a long code corresponding to the spread bit stream; and identifying subscriber device software properties by comparing the error chip pattern with a knowledge base of error chip pattern identifiers.

13. The method of claim 12, wherein the identifying an error chip pattern introduced by the subscriber device in the spread bit stream further comprises identifying the error chip pattern over a predetermined time period.

14. A system for detecting software tampering in a subscriber device comprising:

means for generating a spread bit stream with a predetermined error pattern by introducing an error pattern in a long code at a subscriber device;

means for transmitting the spread bit stream to a base station;

means for identifying the subscriber device by identifying the predetermined error pattern in the spread bit stream; and means for comparing current subscriber device software properties of the subscriber device with predetermined subscriber device software properties associated with the predetermined error pattern in the spread hit stream.

15. The system of claim 14, wherein the means for generating a spread bit stream with a predetermined error pattern at a subscriber device is further for generating the spread bit stream with a predetermined error pattern that includes a plurality of error bits introduced at predetermined locations in the error pattern.

16. The system of claim 15, wherein the means for identifying the subscriber device by identifying the predetermined error pattern in the spread bit stream is further for identifying the subscriber device by identifying the plurality of error bits in the spread bit stream.

17. The system of claim 16, wherein the means for comparing current subscriber device software properties of the subscriber device with predetermined subscriber device software properties associated with the error pattern in the spread bit stream is further for comparing the current subscriber device software properties associated with the error pattern that includes a plurality of error bits with predetermined software properties associated with the plurality of error bits in the spread bit stream.

18. The system of claim 14, wherein the means for identifying the subscriber device by identifying the predetermined error pattern in the spread bit stream is further for time domain averaging the spread bit stream to determine the error pattern.

19. A method of identifying subscriber device software properties comprising:

generating a long code comprised of a plurality of chips for spreading a bit stream according to a CDMA system protocol;

modifying the long code generated according to the CDMA system protocol by introducing an error chip pattern in the long code to provide an error long code that corresponds to the subscriber device software properties;

spreading the bit stream by the error long code to provide an error spread bit stream; and transmitting the error spread bit stream.

20. A modem for a subscriber device comprising:

a long code generator for;

generating a long code comprised of a plurality of bits and introducing an error pattern in the long code, spreading a bit stream by the long code with the error pattern to provide an error spread bit stream that is received by a receiver, the error pattern corresponding to a subscriber device property; and means for transmitting the error spread bit stream.

21. The modem of claim 20 wherein the error pattern is comprised of a number of error chips such that the error chips do not effect signal acquisition by the receiver.

22. A modem for a subscriber device comprising:

a long code generator for;

generating a long code comprised of a plurality of bits and introducing an error pattern in the long code, spreading a bit stream by the long code with the error pattern to provide an error spread bit stream, the error pattern corresponding to a subscriber device feature; and means for transmitting the error spread bit stream.

23. A modem for a subscriber device comprising:

a long code generator for;

generating a long code comprised of a plurality of bits and introducing an error pattern in the long code, spreading a bit stream by the long code with the error pattern to provide an error spread bit stream, the error pattern corresponding to a subset of a plurality of subscriber devices; and means for transmitting the error spread bit stream.

* * * * *